US008620134B2

(12) United States Patent
Koyanagi et al.

(10) Patent No.: US 8,620,134 B2
(45) Date of Patent: Dec. 31, 2013

(54) VIDEO AND AUDIO REPRODUCING APPARATUS AND VIDEO AND AUDIO REPRODUCING METHOD FOR REPRODUCING VIDEO IMAGES AND SOUND BASED ON VIDEO AND AUDIO STREAMS

(75) Inventors: Kazuyuki Koyanagi, Tokyo (JP); Tomohiro Mihara, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 1675 days.

(21) Appl. No.: 11/444,452

(22) Filed: Jun. 1, 2006

(65) Prior Publication Data

US 2007/0019739 A1    Jan. 25, 2007

(30) Foreign Application Priority Data

Jul. 19, 2005  (JP) ................... 2005-208247

(51) Int. Cl.
*H04N 5/932* (2006.01)
*H04N 5/935* (2006.01)

(52) U.S. Cl.
USPC ........... 386/201; 386/211; 386/220; 386/337; 386/338; 386/339; 386/248; 386/230; 386/356

(58) Field of Classification Search
USPC ............... 386/98, 71, 84, 201, 211, 220, 386/337–339, 248, 230, 356
See application file for complete search history.

(56) References Cited

U.S. PATENT DOCUMENTS

| | | | | |
|---|---|---|---|---|
| 5,652,627 A * | 7/1997 | Allen | ............................ | 348/497 |
| 6,724,825 B1 * | 4/2004 | Nemiroff et al. | ........ | 375/240.27 |
| 6,862,045 B2 * | 3/2005 | Morimoto et al. | ............ | 348/515 |
| 7,095,948 B2 * | 8/2006 | Teunissen | ........................ | 386/68 |
| 7,315,622 B2 * | 1/2008 | Mani et al. | ..................... | 380/210 |
| 7,729,593 B2 * | 6/2010 | Yamada | ........................... | 386/84 |
| 8,189,679 B2 * | 5/2012 | Tsukagoshi et al. | ..... | 375/240.25 |
| 2001/0033619 A1 * | 10/2001 | Hanamura et al. | ........ | 375/240.26 |
| 2002/0034255 A1 * | 3/2002 | Zetts | ........................ | 375/240.26 |
| 2002/0174440 A1 | 11/2002 | Usuba et al. | | |
| 2002/0196850 A1 * | 12/2002 | Liu et al. | .................. | 375/240.12 |
| 2003/0066094 A1 * | 4/2003 | van der Schaar et al. | ..... | 725/151 |
| 2003/0103766 A1 * | 6/2003 | Sugahara et al. | ............... | 386/96 |
| 2003/0118059 A1 * | 6/2003 | Sugahara | ...................... | 370/535 |
| 2004/0184540 A1 * | 9/2004 | Miura et al. | ............. | 375/240.12 |
| 2006/0072399 A1 | 4/2006 | Fujimoto et al. | | |

FOREIGN PATENT DOCUMENTS

| | | |
|---|---|---|
| CN | 1390032 A | 1/2003 |
| JP | 2001-291342 | 10/2001 |
| JP | 2002-101395 | 4/2002 |
| JP | 2002-176643 | 6/2002 |

(Continued)

OTHER PUBLICATIONS

Chinese office action dated Aug. 8, 2008 with English translation.

(Continued)

*Primary Examiner* — Helen Shibru

(74) *Attorney, Agent, or Firm* — McGinn IP Law Group, PLLC

(57) ABSTRACT

Upon receipt of an MPEG stream, a time information converter modifies the PTSs of the audio data in the stream so that the timing for outputting the audio sound is delayed by the amount of time that is required for the processing of the video signal to be performed in a video signal processor while keeping the PTSs of the video data in the stream unchanged.

15 Claims, 8 Drawing Sheets

(56) References Cited

FOREIGN PATENT DOCUMENTS

| | | |
|---|---|---|
| JP | 2002-344898 | 11/2002 |
| JP | 2002-354419 | 12/2002 |
| JP | 2003-199053 | 7/2003 |
| WO | WO 2004/077825 A1 | 9/2004 |

OTHER PUBLICATIONS

Proceedings of the 2000 IEICE General Conference, Mar. 28-31, 2000, Hiroshima University, Higashi-Hiroshima, The Institute of Electronics Information and Communication Engineers.

Japanese Office Action dated Apr. 26, 2010, with partial English translation.

* cited by examiner

VIDEO AND AUDIO REPRODUCING APPARATUS AND VIDEO AND AUDIO REPRODUCING METHOD FOR REPRODUCING VIDEO IMAGES AND SOUND BASED ON VIDEO AND AUDIO STREAMS

BACKGROUND OF THE INVENTION

1. Field of the Invention

The present invention relates to a video and audio reproducing apparatus and a video and audio reproducing method, and in particular relates to a video and audio reproducing apparatus and a video and audio reproducing method for reproducing video images and sound (audio) based on video and audio streams such as MPEG (Moving Picture Experts Group) streams.

2. Description of the Related Art

Conventionally, there are known video and audio reproducing apparatuses for reproducing video images and sound based on video and audio streams. For example, there are known video and audio reproducing apparatuses for reproducing video images and sound based on MPEG streams.

Transmission and reproduction of an MPEG stream is performed as follows.

To begin with, a transmitter for transmitting an MPEG stream will be described.

The transmitter encodes a video signal to generate an MPEG video stream that is formed of multiple video frames. The transmitter also encodes the audio signal synchronizing with the video signal to generate an MPEG audio stream that is formed of multiple audio frames.

Subsequently, the transmitter divides the MPEG video stream to generate video data. The transmitter assembles the video data into a PES (packetized elementary stream) packet. The transmitter also divides the MPEG audio stream to generate audio data. The transmitter assembles the audio data into a PES packet that contains no video data. The PES packet contains time information that is to be used for synchronization between video images and sound (audio).

FIG. 1 is an illustrative view showing a PES packet.

As shown in FIG. 1, PES packet 100 includes PTS (Presentation Time Stamp) 100a and DTS (Decoding Time Stamp) 100b.

DTS 100b indicates the time (decode timing) at which the data in PES packet 100 should be decoded. PTS 100a represents the time (output timing) at which the data in PES packet 100 should be reproduced.

The transmitter assigns the same value to the PTS in a PES packet, which contains data of a certain video frame, and to the PTS in a PES packet that contains the data of the audio frame synchronizing with the video frame. Thus, video and audio can be synchronized.

The transmitter, thereafter, transmits the MPEG stream (video and audio stream) including the PES packet, which contains the video data, and the PES packet that contains the audio data. Accordingly, the MPEG stream contains multiple pairs of video data and audio data having PTSs that represents the same output timing.

Next, a reproducing unit for reproducing video images and sound audio based on the MPEG stream will be described.

FIG. 2 is a block diagram showing a reproducing unit.

In FIG. 2, the reproducing unit includes MPEG decoder 1, display unit 2 and audio output unit 3.

MPEG decoder 1 decodes the MPEG stream (video and audio stream) that has been transmitted from the transmitter to generate video and audio signals. MPEG decoder 1 supplies the video signal to display unit 2. MPEG decoder 1 supplies the audio signal to audio output unit 3.

Display unit 2, upon receipt of the video signal from MPEG decoder 1, displays video image in accordance with the video signal.

Audio output unit 3, upon receipt of the audio signal from MPEG decoder 1, provides sound in accordance with the audio signal.

MPEG decoder 1 includes separating circuit 1a, buffers 1b and 1c, system decoder 1d, video decoder 1e and audio decoder 1f.

Separating circuit 1a, upon receipt the MPEG stream from the transmitter, separates video data, audio data, PTSs and DTSs from the MPEG stream. Separating circuit 1a stores the video data into buffer 1b. Separating circuit 1a stores the audio data into buffer 1c. Separating circuit 1a supplies the PTSs and DTSs to system decoder 1d.

Buffer 1b stores the video data supplied from separating circuit 1a.

Buffer 1c stores the audio data supplied from separating circuit 1a.

System decoder 1d provides a decode command to video decoder 1e at the time that is indicated by the DTS relative to the video data in buffer 1b. System decoder 1d also provides an output command to video decoder 1e at the time that is indicated by the PTS relative to the video data.

Further, system decoder 1d provides a decode command to audio decoder 1f at the same time as indicated by the DTS relative to the audio data in buffer 1c. System decoder 1d also provides an output command to audio decoder 1f at the same time as indicated by the PTS relative to the audio data.

Upon receipt of the decode command, video decoder 1e reads the video data from buffer 1b and then decodes the video data to generate a video signal. Then, upon receipt of the output command, video decoder 1e supplies the video signal to display unit 2.

Upon receipt of the decode command, audio decoder 1f reads the audio data from buffer 1c and then decodes the audio data to generate an audio signal. Then, upon receipt of the output command, audio decoder 1f provides the audio signal to audio output unit 3.

Japanese Patent Application Laid-open 2002-354419 discloses a recording and reproducing apparatus for reproducing video images and sound based on MPEG streams.

This recording and reproducing apparatus is configured to rewrite the DTS values and PTS values in accordance with the playback speed for special playback, in order to be able to provide smooth video pictures with its sound synchronized with the pictures when a special playback mode such as fast forward etc., is selected. This recording and reproducing apparatus rewrites the PTS value of a certain video frame and the PTS value of the audio frame, which is synchronized with the video frame, with the same value.

On the other hand, display devices such as liquid crystal displays or plasma displays use a fixed number of pixels. A display device having a fixed number of pixels performs a video signal process called resolution conversion so as to display an image in accordance with an input video signal even if the resolution of the input signal is different from that of its own.

FIG. 3 is a block diagram showing a reproducing apparatus including display unit 2 that performs resolution conversion. In FIG. 3, the same components shown in FIG. 2 are allotted the same reference numerals.

In FIG. 3, display unit 2 includes video signal processor 2a, drive circuit 2b and display device 2c having a fixed number of pixels. Video signal processor 2a includes memory 2a1 and resolution converting circuit 2a2. Audio output unit 3 includes audio output circuit 3a and speaker 3b.

Video signal processor 2a, upon receipt of the video signal from MPEG decoder 1, converts the resolution of the video signal based on the resolution of display device 2c.

Specifically, resolution converting circuit 2a2, upon receipt of the video signal from MPEG decoder 1, stores the video signal into memory 2a1 for a certain period, then reads the video signal from memory 2a1, and then converts the resolution of the video signal.

Drive circuit 2b drives display device 2c in accordance with the video signal whose resolution has been converted by resolution converting circuit 2a2 and displays video image on display device 2c in accordance with the video signal.

Audio output circuit 3a drives speaker 3b in accordance with the audio signal received from MPEG decoder 1 and provides sound from speaker 3b in accordance with the audio signal.

Video signal processor 2a stores the video signal into memory 2a1 for a certain period, and then performs resolution conversion. Accordingly, the display timing of display device 2c is delayed by the amount of time that is required for resolution conversion.

Video signal processor 2a also performs video signal processes other than resolution conversion. For this reason, in actual practice, the display timing of display device 2c is delayed by the amount of time that is required for those video signal processes.

On the contrary, audio output unit 3 does not have any delay as in the video signal processing.

Accordingly, even if, for example, MPEG decoder 1 synchronizes video image and sound based on the DTS values and PTS values, occurrence of the video image is delayed until after sound is generated because of video signal processing that is performed by display unit 2.

FIG. 4 is a timing chart for illustrating the delay of the video. FIG. 4(a) shows the timing at which the video signal is written into memory 2a1. FIG. 4(b) shows the timing at which the video signal is read out from memory 2a1. FIG. 4(c) shows the timing at which the audio signal is provided.

As shown in FIG. 4(a) and FIG. 4(c), prior to the execution of video signal processing, the video frame (video signal) and audio frame (audio signal) having the same PTS value are synchronized with each other.

However, as shown in FIG. 4(b) and FIG. 4(c), after execution of video signal processing, for the video frame and audio frame that have the same PTS value, the video frame is provided after the audio frame (see delay A in FIG. 4(c)).

The recording and reproducing apparatus described in Japanese Patent Application Laid-open 2002-354419 rewrites the PTS value of a certain video frame and the PTS value of the audio frame, which is synchronized with the video frame, with the same value. Accordingly, if this recording and reproducing apparatus is used as MPEG decoder 1, video image delay due to video signal processing will occur.

For this reason, video images and sound are supplied with a timing lag therebetween, or if the video images and sound must be synchronized, it is necessary to provide extra hardware such as a delay circuit for audio signals, or the like.

SUMMARY OF THE INVENTION

It is an object of the present invention to provide a video and audio reproducing apparatus and a video and audio reproducing method, which enable synchronization between video image and audio sound without using any delay circuit for audio signals even when a video signal process such as resolution conversion is performed.

In order to achieve the above object, the video and audio reproducing apparatus according to the present invention reproduces video images and audio sound based on a video and audio stream that includes video data, which has video output information representing the timing for outputting video image, and audio data that has audio output information representing the timing for outputting audio sound. The video and audio reproducing apparatus includes a modifying unit, a decoder, a display unit and an audio output unit.

The modifying unit, upon receipt of the video and audio stream, modifies the audio output information so that the timing for outputting audio sound is delayed while keeping the video output information unchanged.

The decoder decodes the audio data to generate an audio signal, and provides the audio signal at the output timing that is represented by the audio output information that has been modified by the modifying unit, and also decodes the video data to generate a video signal, and provides the video signal at the output timing that is represented by the video output information.

The display unit displays video image corresponding to the video signal provided from the decoder. The audio output unit provides audio sound corresponding to the audio signal provided from the decoder.

According the above invention, the audio output information is modified so as to delay the timing for outputting audio sound while keeping the timing for outputting video image unchanged.

Accordingly, modification of the audio output information makes it possible to delay the audio sound by the amount of time that the video image is delayed due to video signal processing. As a result, it is possible to synchronize the video images and audio sound without using any delay circuit for audio signals.

It is preferred that the time, which is required for processing the video signal, is detected and that the audio output information is modified so that the timing for outputting the audio data is delayed by the detected processing time.

For example, when different formats of video signals such as the NTSC (National Television Standards Committee) signal and the PAL (Phase Alternation by Line) signal are handled, there is a possibility that the processing time for the NTSC signal is different from the processing time for the PAL signal.

According to the above invention, the audio output information is automatically modified based on the detected processing time. Therefore, it is possible to synchronize the audio sound and video images by automatically modifying the audio output information in accordance with the video signal format.

It is preferred that the process be conversion of the resolution of the video signal.

According to the above invention, if delay of video image due to resolution conversion takes place, it is possible to delay the timing for outputting audio sound by the amount of delay of the video image.

It is preferred that the video and audio stream be an MPEG stream, the video data be included in an MPEG video stream, the audio data be included in an MPEG audio stream, and the output information comprises PTSs.

According to the above invention, when video images and audio sound are reproduced based on the MPEG stream, the PTSs are modified. Therefore, it is possible to delay the timing for outputting audio sound by the amount of time that the video image is delayed due to the video signal processing.

Accordingly, it is possible to synchronize the video images and audio sound without using any delay circuit for audio signals.

It is also preferred that the DTSs that represent the decode timing are modified as well as the PTSs.

According to the above invention, when video images and audio sound are reproduced based on the MPEG stream, the PTSs and DTSs are modified. Therefore, it is possible to delay the timing for outputting audio sound by the amount of time that the video image is delayed due to the video signal processing. Accordingly, it is possible to synchronize the video images and audio sound without using any delay circuit for audio signals.

Further, the video and audio reproducing apparatus according to the present invention reproduces video images and audio sound based on a video and audio stream that includes video data, which has video output information representing the timing for outputting video image, and audio data which has audio output information representing the timing for outputting audio sound, and includes a modifying unit, a decoder, a display unit and an audio output unit.

The modifying unit, upon receipt of the video and audio stream, modifies the audio output information and the video output information so that the amount of time that the audio sound is delayed is longer than the amount of time that the video image is delayed.

The decoder decodes the audio data to generate an audio signal, and provides the audio signal at the output timing that is represented by the audio output information that has been modified by the modifying unit, and also decodes the video data to generate a video signal, and provides the video signal at the output timing that is represented by the video output information that has been modified by the modifying unit.

The display unit displays video image corresponding to the video signal provided from the decoder.

The audio output unit provides audio sound corresponding to the audio signal provided from the decoder.

According to the above invention, the audio output information and video output information are modified so that the amount of time that the audio sound is delayed is longer than the amount of time that the video image is delayed.

Therefore, it is possible to delay the timing for outputting audio sound relative to the video image by the amount of time that the video image is delayed due to the video signal processing. Accordingly, it is possible to synchronize the video images and audio sound without using any delay circuit for audio signals.

Since the audio output information and video output information are modified, it is possible to adjust both the timing for outputting audio sound and the timing for outputting video image.

The above and other objects, features, and advantages of the present invention will become apparent from the following description with reference to the accompanying drawings which illustrate an example of the present invention.

DETAILED DESCRIPTION OF THE PREFERRED EMBODIMENT(S)

Figure 5:
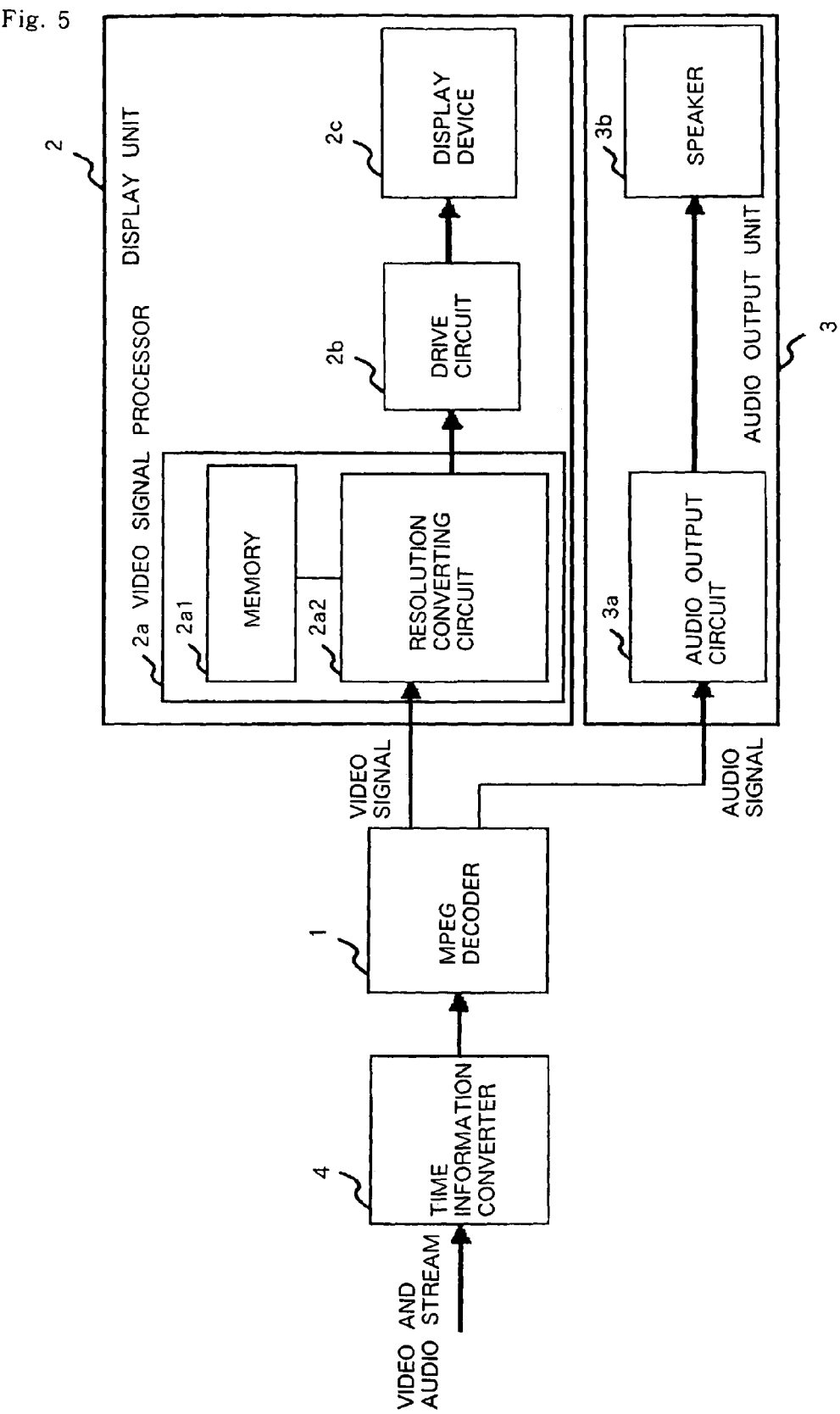
FIG. 5 is a block diagram showing a video and audio reproducing apparatus in accordance with one embodiment according to the present invention.

FIG. 5 is a block diagram showing a video and audio reproducing apparatus in accordance with one embodiment according to the present invention. In FIG. 5, the same components shown in FIG. 3 are allotted the same reference numerals.

Figure 1:
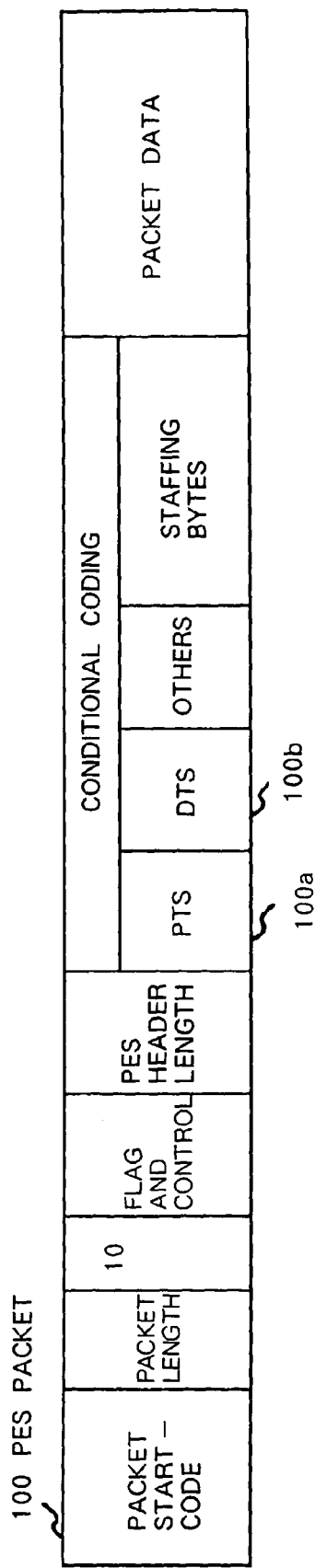
FIG. 1 is an illustrative view showing a PES packet.
Figure 2:
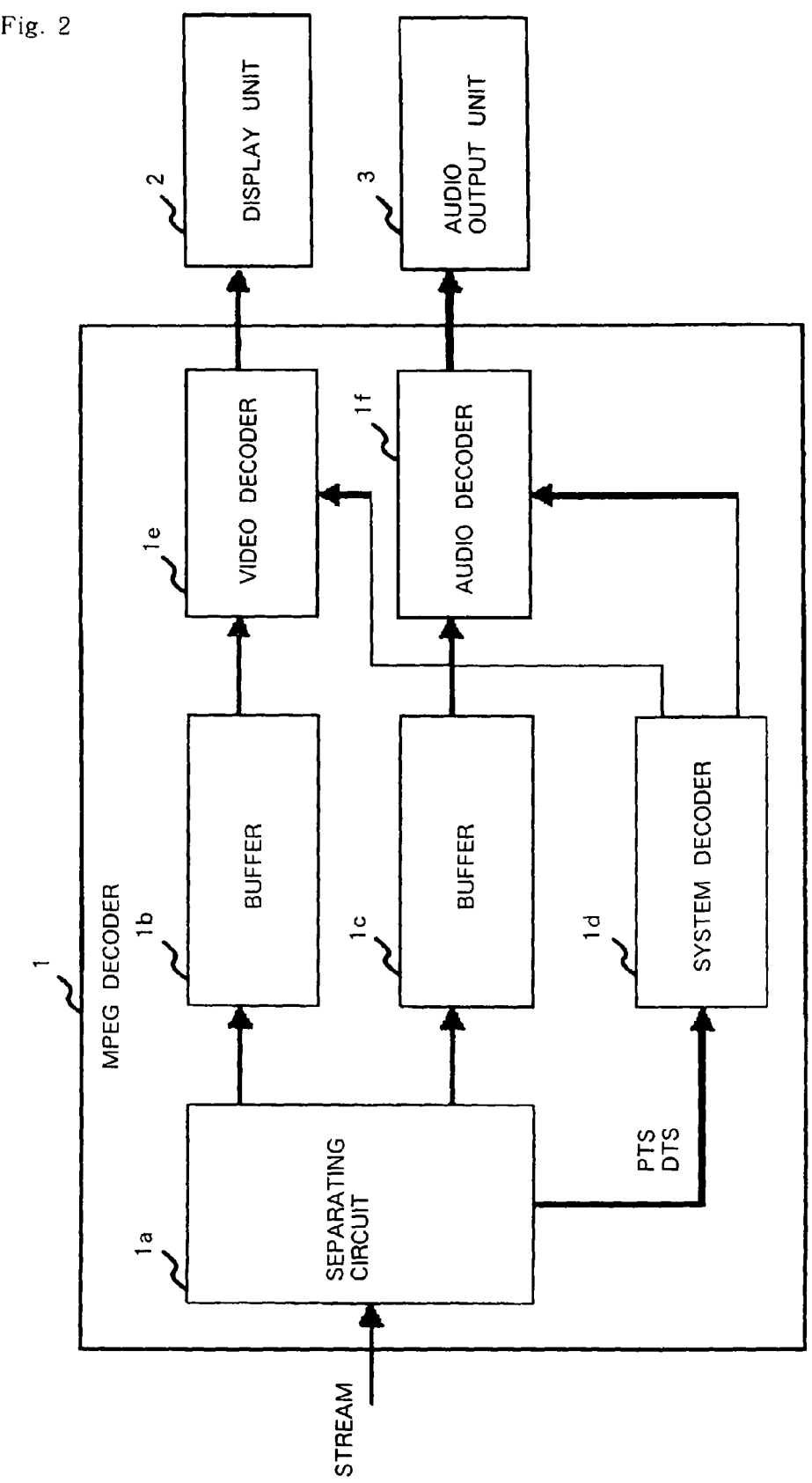
FIG. 2 is a block diagram showing a reproducing unit.
Figure 3:
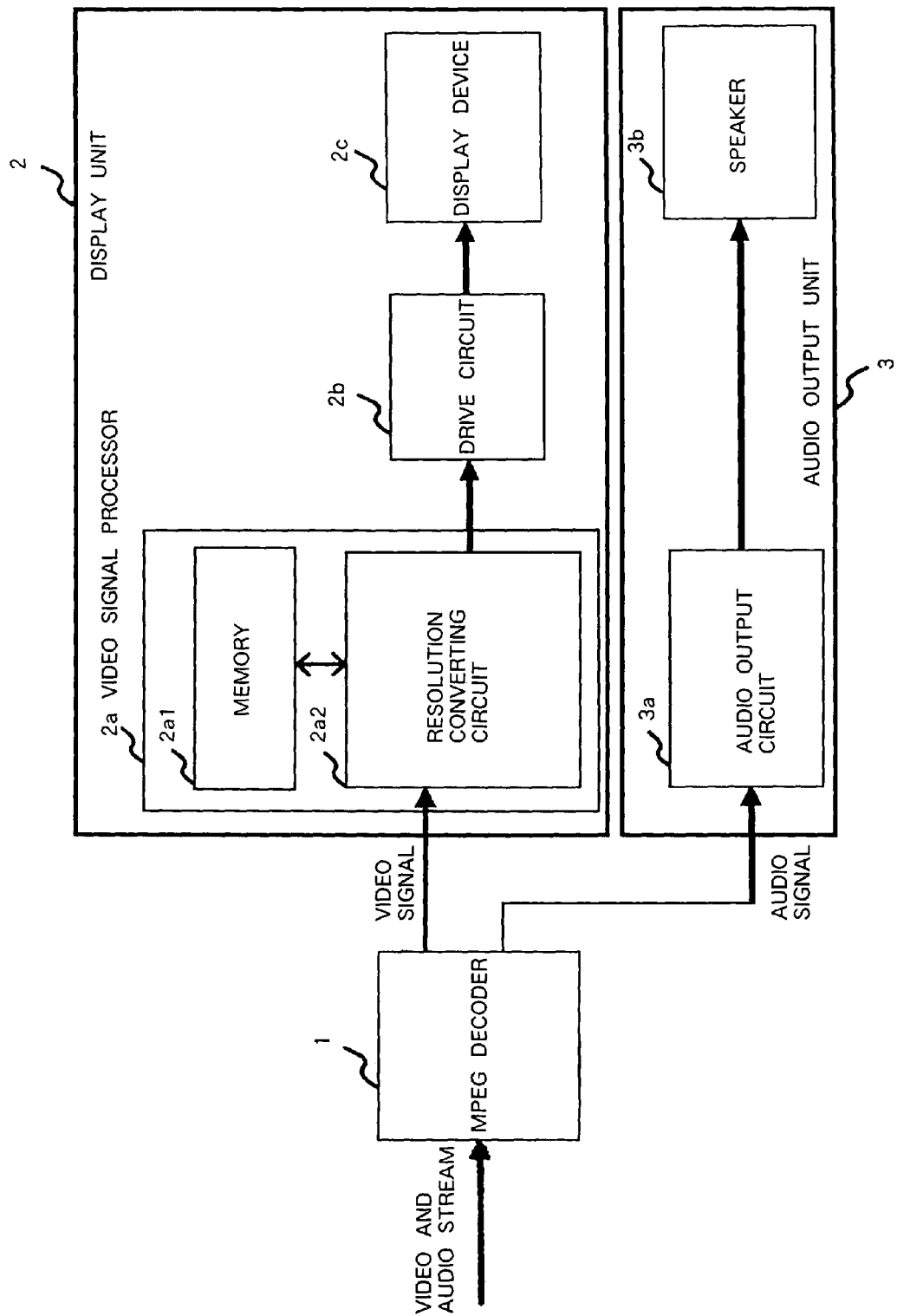
FIG. 3 is a block diagram showing a reproducing apparatus.
Figure 4:
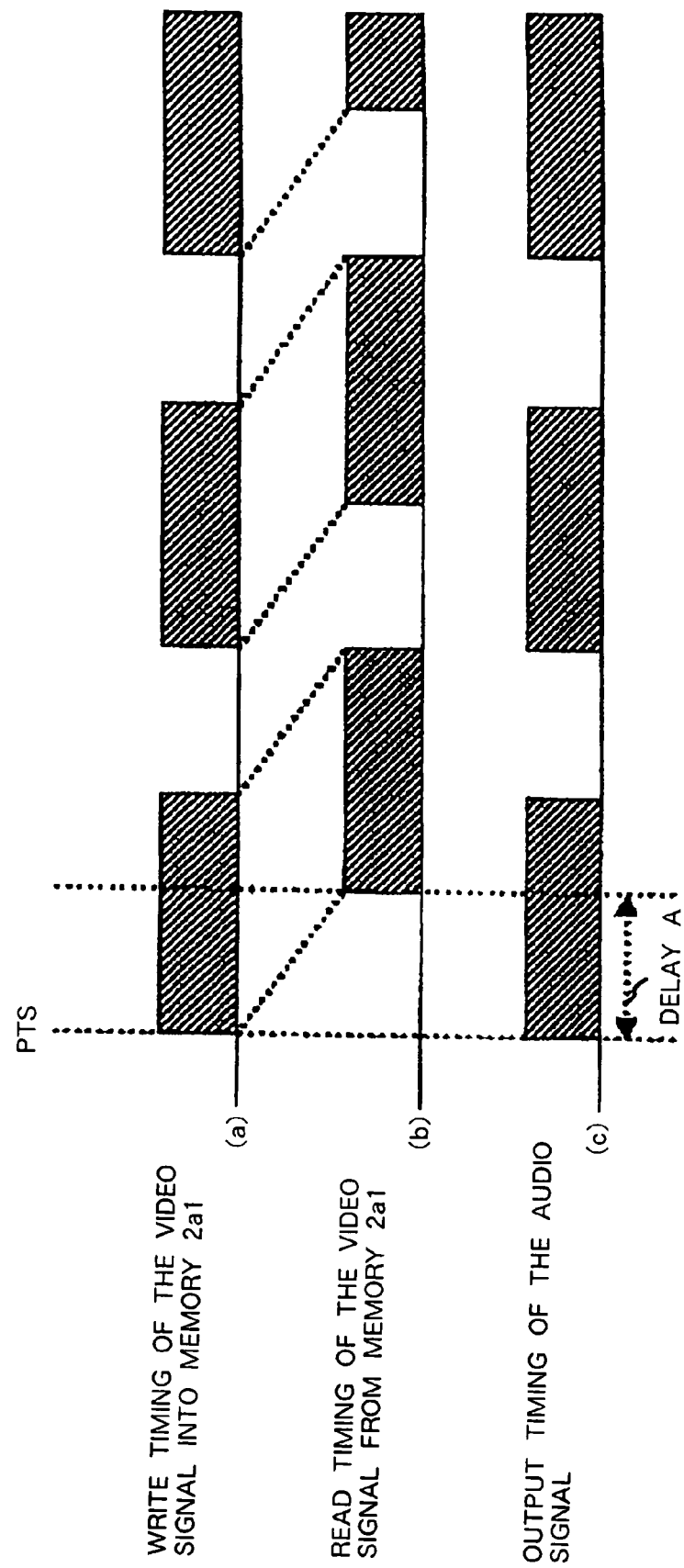
FIG. 4 is a timing chart explaining a video delay.

In this video and audio reproducing apparatus, time information converter 4 is added to the reproducing apparatus shown in FIG. 3.

In FIG. 5, the video and audio reproducing apparatus includes MPEG decoder 1, display unit 2, audio output unit 3 and time information converter 4.

Time information converter 4 is one example of a modifying unit. Time information converter 4 receives an MPEG stream (video and audio stream).

The MPEG stream includes PES packets, which contain video data and PTSs (video output information) representing predetermined values, and PES packets which contain audio data and PTSs (audio output information) representing predetermined values.

Accordingly, the MPEG stream contains multiple pairs of video and audio data that have PTSs indicating the same output timing.

Time information converter 4, upon receipt of an MPEG stream, changes the PTSs of the audio data in the stream so that the timing for outputting the audio sound corresponding to the audio data in that stream is delayed.

For example, time information converter 4 changes the PTSs of the audio data in the MPEG stream so that the timing for outputting the audio sound is delayed by the amount of processing time that is spent for video signal processing that is to be performed by video signal processor 2a. Specifically, time information converter 4 adds the processing time to the PTS values of audio data.

Time information converter 4 maintains the PTSs of the video data in the stream without change.

Figure 6:
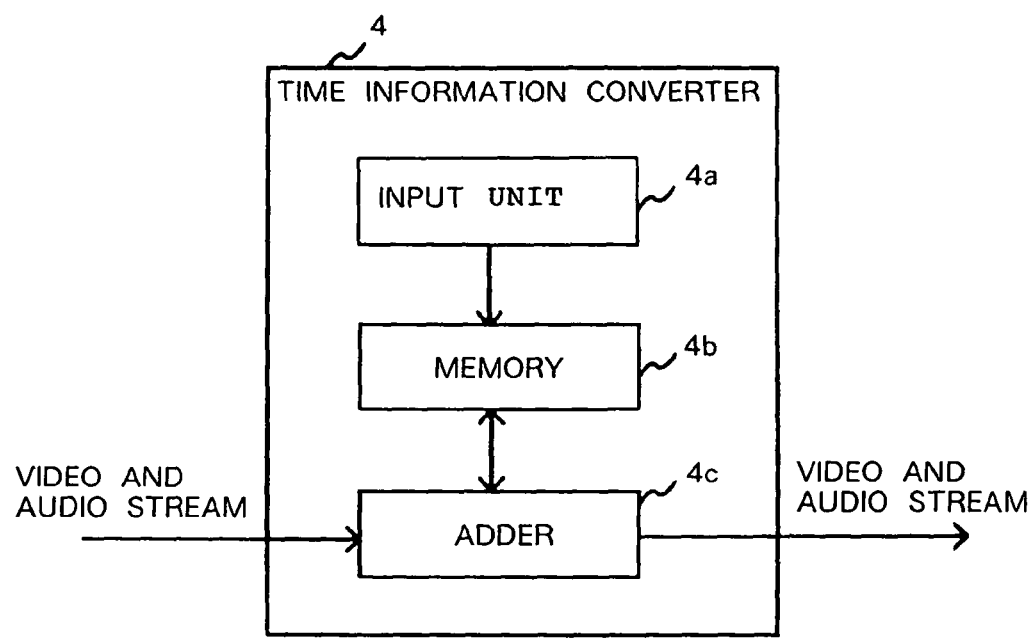
FIG. 6 is a block diagram showing one example of time information converter 4.

FIG. 6 is a block diagram showing one example of time information converter 4. Time information converter 4 should not be limited to the configuration shown in FIG. 6 but can be changed as appropriate.

In FIG. 6, time information converter 4 includes input unit 4a, memory 4b and adder 4c.

Input unit 4a receives a value to be added to the PTS value of the audio data. For example, input unit 4a receives the value from the user.

In the present embodiment, input unit 4a receives processing time information that represents the amount of processing time that is spent for video signal processing that is to be performed by video signal processor 2a. The value that is received by input unit 4a can be changed as appropriate.

Memory 4b stores the value received through input unit 4a.

Adder 4c adds the value in memory 4b to the PTS values of audio data. The timing for outputting audio sound is thereby delayed.

In the present embodiment, adder 4c also adds the value in memory 4b to the DTS values of audio data. Therefore, the timing for decoding audio data is also delayed.

Time information converter 4 provides an MPEG stream, which has the modified PTSs and DTSs in the audio data, for MPEG decoder 1.

MPEG decoder 1, upon receipt of the MPEG stream, decodes the video data in the stream at the timing indicated by DTSs in the video data to generate a video signal.

Then, MPEG decoder 1 provides the video signal for display unit 2 at the timing represented by PTSs in the video data.

When MPEG decoder 1 receives the MPEG stream, MPEG decoder 1 decodes the audio data in that stream at the timing represented by the DTSs in the audio data, which have been modified by time information converter 4, to generate an audio signal.

Then, MPEG decoder 1 provides the audio signal for audio output unit 3 at the timing represented by the PTSs in the audio data which have been modified by time information converter 4.

Since time information converter 4 modifies the PTS values of the audio data to delay the timing for outputting the audio signal, the audio signal that is supplied from MPEG decoder 1 is provided after the video signal, which is synchronized with that audio signal, is provided.

Resolution converting circuit 2a2 stores the video signal, which is provided at a timing earlier than that of the audio signal, into memory 2a1. Then resolution converting circuit 2a2 converts the resolution of the video signal stored in memory 2a1 in accordance with the resolution of display device 2c.

Resolution converting circuit 2a2 provides the video signal, which has the converted resolution, for drive circuit 2b.

This timing, specifically, the timing at which resolution converting circuit 2a2 provides the video signal corresponds to the output timing that is represented by the PTS value of the audio data. Therefore, MPEG decoder 1 provides the audio signal at this timing.

Accordingly, the timing at which drive circuit 2b receives the video signal synchronizes with the timing at which the audio output circuit 3a receives the audio signal.

Drive circuit 2b drives display device 2c in accordance with the video signal which has the resolution that has been converted by resolution converting circuit 2a2, and displays the video image that corresponds to the video signal on display device 2c.

Audio output circuit 3a drives speaker 3b in accordance with the audio signal received from MPEG decoder 1 and provides the audio sound that corresponds to the audio signal from speaker 3b.

As a result, the video images and audio sound are synchronized with each other.

Next, the operation will be described.

For example, the user inputs processing time information, which indicates the amount of processing time that is spent for video signal processing that is to be performed by video signal processor 2a, into input unit 4a.

Input unit 4a, upon receipt of the processing time information, stores the processing time information into memory 4b.

Adder 4c, upon receipt of the MPEG stream, adds the processing time, which is represented by the processing time information, to the PTSs and DTSs in the audio data in the MPEG stream.

Adder 4c provides the MPEG stream, which has the modified PTSs and DTSs in the audio data, for MPEG decoder 1 (specifically, separating circuit 1a).

Separating circuit 1a separates the video data, audio data, PTSs and DTSs from the MPEG stream transmitted from adder 4c.

Separating circuit 1a stores the video data into buffer 1b. Separating circuit 1a stores the video data into buffer 1c. Further, separating circuit 1a provides the PTSs and DTSs for system decoder 1d.

System decoder 1d provides a decode command for video decoder 1e at the time that is represented by the DTS relative to the video data that is stored in buffer 1b. System decoder 1d provides an output command for video decoder 1e at the time that is represented by the PTS relative to the video data.

Further, system decoder 1d provides a decode command for audio decoder 1f at the time that is represented by the DTS relative to the audio data that is stored in buffer 1c. System decoder 1d provides an output command for audio decoder 1f at the time that is represented by the PTS relative to the audio data.

Video decoder 1e, upon receipt of the decode command from system decoder 1d, reads the video data from buffer 1b and then decodes the video data to generate a video signal. Thereafter, when video decoder 1e receives the output command from system 1d, video decoder 1e provides the video signal for display unit 2.

On the other hand, audio decoder 1f, upon receipt of the decode command from system decoder 1d, reads the audio data from buffer 1c and then decodes the audio data to generate an audio signal. Thereafter, when audio decoder 1f receives the output command from system 1d, audio decoder provides the audio signal for audio output unit 3.

Since time information converter 4 has changed the PTS values in the audio data in order to delay the timing for outputting the audio signal, the audio signal that is provided from MPEG decoder 1 is provided after the video signal, which is to be synchronized with that audio signal, is provided.

Resolution converting circuit 2a2 in display unit 2 stores the video signal, which is provided at a timing earlier than that of the audio signal, into memory 2a1, then converts the resolution of the video signal in accordance with the resolution of display device 2c.

Resolution converting circuit 2a2 provides the video signal, which has the converted resolution, for drive circuit 2b.

At this timing, specifically, at the timing at which resolution converting circuit 2a2 provides the video signal, MPEG decoder 1 provides the audio signal.

Accordingly, the timing, at which drive circuit 2b receives the video signal, synchronizes with the timing at which audio output circuit 3a receives the audio signal.

Drive circuit 2b drives display device 2c in accordance with the video signal, whose resolution has been converted by resolution converting circuit 2a2, and displays the video image that corresponds to the video signal on display device 2c.

Audio output circuit 3a drives speaker 3b in accordance with the audio signal received from MPEG decoder 1 and provides audio sound that corresponds to the audio signal from speaker 3b.

As a result, video images and audio sound are synchronized with each other.

According to the present embodiment, time information converter 4 modifies the PTSs (audio output information) in the audio data so as to delay the timing for outputting audio sound. Time information converter 4 maintains the PTSs in the video data without change.

Accordingly, modification of the PTSs in the audio data makes it possible to delay the timing for outputting the audio sound by the amount of time that the video image is delayed due to the video signal processing. As a result, it is possible to synchronize video images and audio sound without using any delay circuit for audio signals.

Since the PTSs in the audio data are digital values, the time delay for audio sound can be easily set.

Further, according to the present embodiment, MPEG streams are used as video and audio streams, and the video data is contained in the MPEG video stream and the audio data is contained in the MPEG audio stream while PTSs are used for the audio output information and video output information.

In this case, when video images and audio sound are reproduced based on the MPEG stream, the PTSs are modified. Therefore, it is possible to delay the timing for outputting audio sound by the amount of time that the video image is delayed due to the video signal processing.

Accordingly, when the video images and audio sound are reproduced based on the MPEG stream, it is possible to synchronize the video images and audio sound without using any delay circuit for audio signals.

Further, in the present embodiment, time information converter 4 modifies the DTSs in the audio data as well as the PTSs in the audio data.

In this case, when video images and audio sound are reproduced based on the MPEG stream, both the PTSs and DTSs are modified. Therefore, it is possible to delay the timing for outputting audio sound by the amount of time that the video is delayed due to the video signal processing. Further, it is also possible to adjust the decode timing of the audio data in accordance with the output timing of the audio signal.

Accordingly, when video images and audio sound are reproduced based on the MPEG stream, it is possible to synchronize the video images and audio sound without using any delay circuit for audio signals.

Next, another embodiment according to the present invention will be described.

Figure 7:
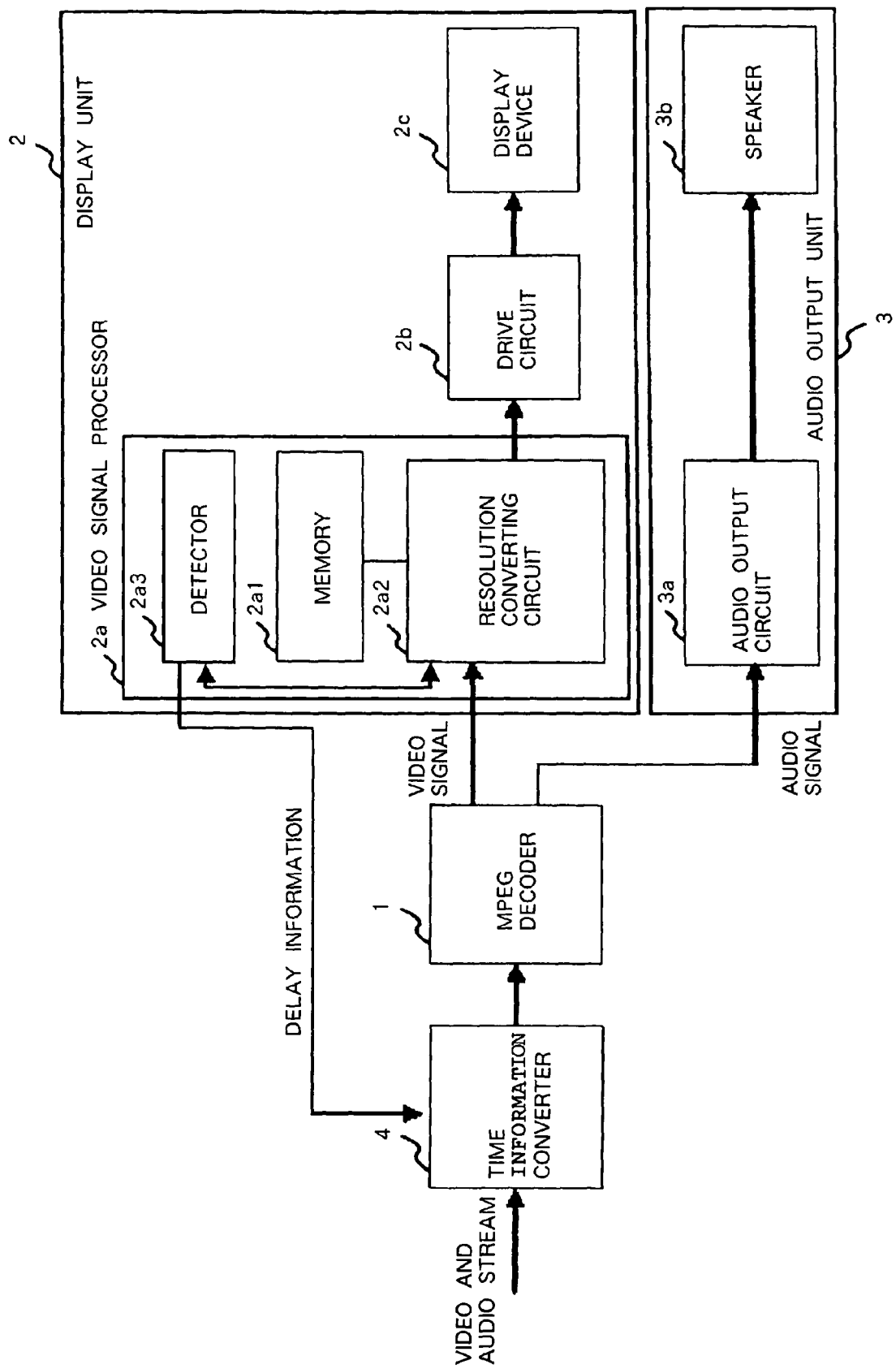
FIG. 7 is a block diagram showing a video and audio reproducing apparatus in accordance with another embodiment according to the present invention.

FIG. 7 is a block diagram showing a video and audio reproducing apparatus in accordance with another embodiment according to the present invention. In FIG. 7, the components shown in FIG. 5 are allotted the same reference numerals.

In the video and audio reproducing apparatus shown in FIG. 7, detector 2a3 is added to the video and audio reproducing apparatus shown in FIG. 5.

Detector 2a3 detects the amount of time that is required for video signal processing that is performed by video signal processor 2a. In the present embodiment, detector 2a3 detects the amount of time that is required for resolution conversion that is executed by resolution converting circuit 2a2. Detector 2a3 may not only detect the amount of time required for resolution conversion but also detect the amount of time required for all the video signal processes that are executed by video signal processor 2a.

When video signal processor 2a handles different formats of video signals such as the NTSC signal and the PAL signal, for example, the processing time that is performed by video signal processor 2a may be different depending on the format of the signal to be processed. Detector 2a3 detects such a processing time.

Detector 2a3 provides the delay information, which is represented by the detected time, for time information converter 4 (specifically input unit 4a).

Input unit 4a, upon receipt of the delay information, stores the delay information into memory 4b.

Adder 4c, upon receipt of the MPEG stream, adds the time, which is represented by the delay information in memory 4b, to the PTSs and DTSs in the audio data in the stream. Adder 4c provides the MPEG stream, which has the modified PTSs and DTSs, for MPEG decoder 1 (specifically, separating circuit 1a).

According to the present embodiment, time information converter 4 modifies the PTSs in the audio data so that the timing for outputting the audio sound is delayed by the amount of processing time that is detected by video signal processor 2a.

In this case, the audio output information is automatically modified based on the amount of processing time that varies depending on the format of the video signal. Therefore, it is possible to synchronize the audio sound and video images even if the format of video signal changes.

Further, the value that is to be stored in memory 4b can be automatically modified to an appropriate value.

Further, in the present embodiment, video signal processor 2a detects the amount of time that is required for converting the resolution of the video signal.

In this case, if the video image is delayed because resolution conversion is taking place, it is possible to delay the timing for outputting the audio sound by the same amount of time that the video image is delayed.

Time information converter 4 may be modified as follows.

Time information converter 4, upon receipt of the MPEG stream, modifies the PTSs in the audio data and the PTSs in the video data so that the amount of time that the audio sound is delayed becomes longer than the amount of time that the video image is delayed.

Time information converter 4 provides the MPEG stream, which has the modified PTSs in the audio data and the modified PTSs in the video data, for MPEG decoder 1.

Figure 8:
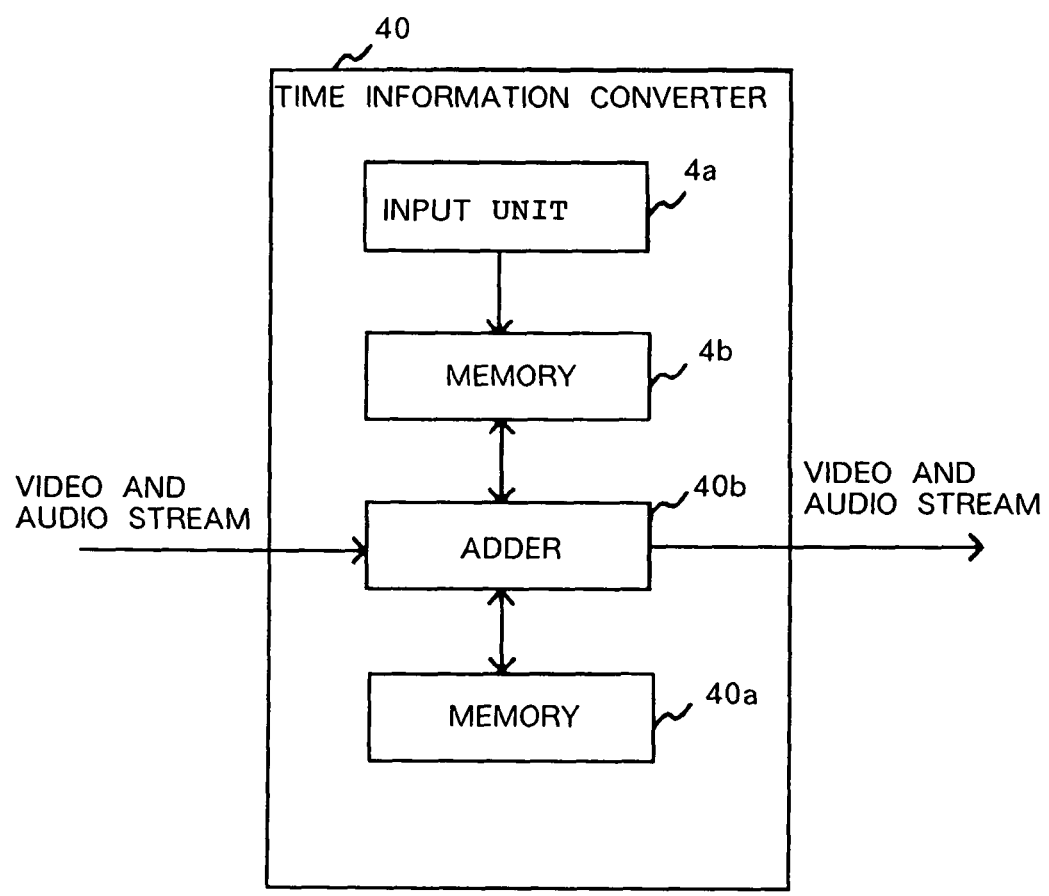
FIG. 8 is a block diagram showing one example of time information converter 40.

FIG. 8 is a block diagram showing time information converter 40 as a modified example of time information converter 4. In FIG. 8, the same components described in FIG. 6 are allotted the same reference numerals. The modified example of time information converter 4 may be modified as appropriate, not limited to the configuration shown in FIG. 8.

In FIG. 8, time information converter 40 includes input unit 4a, memory 4b, memory 40a and adder 40b.

Memory 40a stores the information representing the time delay of video image.

Upon receipt of the MPEG stream, adder 40b adds the time delay, which is represented by the information in memory 40a, to the PTSs and DTSs in the video data in the stream. The adder 40b adds the time delay and the processing time that is represented by the delay information in memory 4b to the PTSs and DTSs in the audio data in the stream.

Adder 40b provides the MPEG stream, which has the modified PTSs and DTSs, for MPEG decoder 1 (specifically, separating circuit 1a).

In this case, MPEG decoder 1 operates as follows.

MPEG decoder 1, upon receipt of the MPEG stream from time information converter 40, decodes the video data in that stream at the timing, which is represented by the DTSs in the video data that has been modified by adder 40b, to generate a video signal.

Then MPEG decoder 1 provides the video signal for display unit 2 at the timing that is represented by PTSs in the video data that has been modified by adder 40b and displays video image corresponding to the video signal on display unit 2.

Further, MPEG decoder 1, upon receipt of the MPEG stream, decodes the audio data in that stream at the timing, which is represented by the DTSs in the audio data that has been modified by adder 40b, to generate an audio signal.

Then MPEG decoder 1 provides the audio signal for audio output unit 3 at the timing, which is represented by PTSs in the audio data that has been modified by adder 40b, and supplies audio sound corresponding to the audio signal from audio output unit 3.

According to the modified example, time information converter 40 modifies the PTSs in the audio data and PTSs in the video data so that the amount of time that the audio sound is delayed becomes longer than the amount of time that the video image is delayed.

In this case, both the PTSs in the video data and the PTSs in the audio data are modified. Therefore, it is possible to delay the timing for outputting the audio sound relative to the video image by the same amount of time that the video image is delayed due to the video signal processing. Accordingly, it is possible to synchronize the video images and audio sound without using any delay circuit for audio signals.

Since the PTSs in the audio data and the PTSs in the video data are modified, it is possible to adjust both the audio and video output timing.

While a preferred embodiment of the present invention has been described using specific terms, such description is for illustrative purposes only, and it is to be understood that changes and variations may be made without departing from the spirit or scope of the following claims.

What is claimed is:

1. A video and audio reproducing apparatus for reproducing video images and audio sound based on a video and audio stream that includes video data including video output information representing video output timing and audio data including audio output information representing audio output timing, said apparatus comprising:
   a modifying unit for modifying, upon receipt of the video and audio stream, the audio output information and the video output information so that an amount of time that the audio sound is delayed is longer than an amount of time that the video images are delayed;
   a decoder for decoding the audio data to generate an audio signal, and for providing the audio signal at the audio output timing represented by the audio output information that has been modified by said modifying unit, and for decoding the video data to generate a video signal, and for providing the video signal at the video output timing represented by the video output information that has been modified by said modifying unit;
   a display unit for displaying video image corresponding to the video signal provided from said decoder;
   an audio output unit for supplying sound corresponding to the audio signal provided from said decoder; and
   a video signal processor for processing the video signal,
   wherein said modifying unit modifies the video output information by adding a first time to a video presentation time stamp (VPTS) representing the video output timing so that the video output timing is delayed by the first time, and modifies the audio output information by adding a second time, the second time being made up by adding the first time to an amount of time that is required for processing the video signal, to an audio presentation time stamp (APTS) representing the audio output timing so that the audio output timing is delayed by the second time.

2. The video and audio reproducing apparatus according to claim 1, wherein said display unit includes a video signal processor for processing the video signal and also for detecting the amount of time that is required for the process of the video signal, and
   wherein said modifying unit modifies the audio output information so that the audio output timing is delayed by the amount of, time detected by said video signal processor.

3. The video and audio reproducing apparatus according to claim 2, wherein said video signal processor performs conversion of resolution of the video signal.

4. The video and audio reproducing apparatus according to claim 1, wherein the video and audio stream comprises an MPEG stream,
   wherein the video data is included in an MPEG video stream,
   wherein the audio data is included in an MPEG audio stream, and
   wherein the audio output information and the video output information comprise PTSs.

5. The video and audio reproducing apparatus according to claim 4, wherein said modifying unit, upon receipt of the MPEG stream, further modifies DTSs representing decoding timing in the audio data.

6. A video and audio reproducing apparatus for reproducing video images and audio sound based on a video and audio stream, that includes video data including video output information representing video output timing and audio data including audio output information representing audio output timing, said apparatus comprising:
   modifying means for modifying, upon receipt of the video and audio stream, the audio output information and the video output information so that an amount of time that the audio sound is delayed is longer than an amount of time that the video images are delayed;
   decoding means for decoding the audio data to generate an audio signal, and for providing the audio signal at the audio output timing represented by the audio output information that has been modified by said modifying means, and for decoding the video data to generate a video signal, and for providing the video signal at the video output timing represented by the video output information that has been modified by said modifying means;
   display means for displaying video image corresponding to the video signal provided from said decoding means;
   audio output means for supplying audio sound corresponding to the audio signal provided from said decoding means; and
   video signal processing means for processing the video signal,
   wherein said modifying means modifies the video output information by adding a first time to a video presentation time stamp (VPTS) representing the video output timing so that the video output timing is delayed by the first time, and modifies the audio output information by adding a second time, the second time being made up by adding the first time to an amount of time that is required for processing the video signal, to an audio presentation time stamp (APTS) representing the audio output timing so that the audio output timing is delayed by the second time.

7. A video and audio reproducing method implemented by a video and audio reproducing apparatus for reproducing video images and audio sound based on a video and audio stream that includes video data having video output information representing video output timing and audio data having audio output information representing audio output timing, said method comprising:

receiving the video and audio stream;

when the video and audio stream is received, modifying the audio output information and the video output information so that an amount of time that the audio sound is delayed is longer than an amount of time that the video images are delayed;

decoding the video data to generate a video signal and providing the video signal at the video output timing represented by the modified video output information;

decoding the audio data to generate an audio signal and providing the audio signal at the audio output timing represented by the modified audio output information;

processing the provided video signal;

displaying video image corresponding to the provided video signal; and supplying sound corresponding to the provided audio signal, wherein said modifying modifies the video output information by adding a first time to a video presentation time stamp (VPTS) representing the video output timing so that the video output timing is delayed by the first time, and modifies the audio output information by adding a second time, the second time being made up by adding the first time to an amount of time that is required for processing the video signal, to an audio presentation time stamp (APTS) representing the audio output timing so that the audio output timing is delayed by the second time.

8. The video and audio reproducing method according to claim 7, wherein said displaying comprises:

said processing the provided video signal;

detecting the amount of time required for the process of the provided video signal;

displaying video image corresponding to the processed video signal, and wherein said modifying further comprises:

modifying the audio output information so that the audio output timing is delayed by the detected amount of time.

9. The video and audio reproducing method according to claim 8, wherein said processing comprises:

performing a process of converting resolution of the video signal.

10. The video and audio reproducing method according to claim 7, wherein the video and audio stream comprises an MPEG stream, wherein the video data is included in an MPEG video stream, wherein the audio data is included in an MPEG audio stream, and wherein the audio output information and the video output information comprise PTSs.

11. The video and audio reproducing method according to claim 10, wherein said modifying further includes:

when receiving the MPEG stream, further modifying decoding time stamps (DTSs) representing the decoding timing of the audio data.

12. The video and audio reproducing apparatus according to claim 1, wherein the audio output information is modified prior to the audio data being decoded.

13. The video and audio reproducing apparatus according to claim 1, wherein the first time is greater than the second time.

14. The video and audio reproducing apparatus according to claim 1, wherein the first time comprises a time delay of the video signal.

15. The video and audio reproducing apparatus according to claim 1, wherein the modifying unit modifies the video output information and modifies the audio output information prior to transmitting the video and audio stream to the decoder.

* * * * *